March 3, 1964 J. KRITZ 3,123,727
HIGH POWER SONIC TRANSDUCERS
Filed June 15, 1960

INVENTOR.
JACK KRITZ
BY
Raymond A. Paquin
ATTORNEY.

United States Patent Office 3,123,727

Patented Mar. 3, 1964

3,123,727

HIGH POWER SONIC TRANSDUCERS

Jack Kritz, Westbury, N.Y., assignor to American Bosch Arma Corporation, a corporation of New York Filed June 15, 1960, Ser. No. 36,434
7 Claims. (Cl. 310—8.2)

The present invention relates to sonic transducers and has particular reference to composite constructions of the vibrating element.

The advent of high efficiency flexsure mode sonic transducers has exposed the inadequacy of the common materials used for making piezoelectrically driven transducers. Such transducers may be damaged or destroyed when energized by the high powers they theoretically can be expected to radiate. Also, those materials which show a high degree of piezoelectric activity usually possess high internal losses so that their use in high efficiency devices has been more or less limited. The theory of the high efficiency flexure mode transducer is discussed in copending patent application Serial No. 13,923 filed March 9, 1960 for Sonic Transducers.

The present invention is a composite piezoelectric structure comprising a relatively thick layer of metal having low internal losses coated on each surface by a relatively thin layer of piezoelectric material. If the structure is fabricated at elevated temperatures a relatively brittle piezoelectric material such as the barium-titanate ceramics can be prestressed in compression at ordinary operating temperatures with resulting additional strength under vibration.

Figure 1:
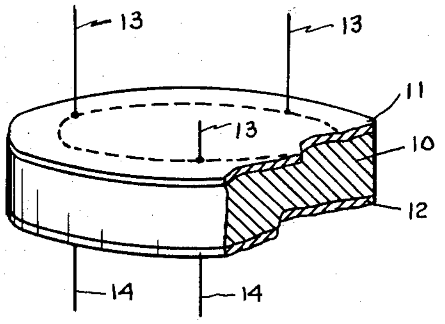
Figure 2:
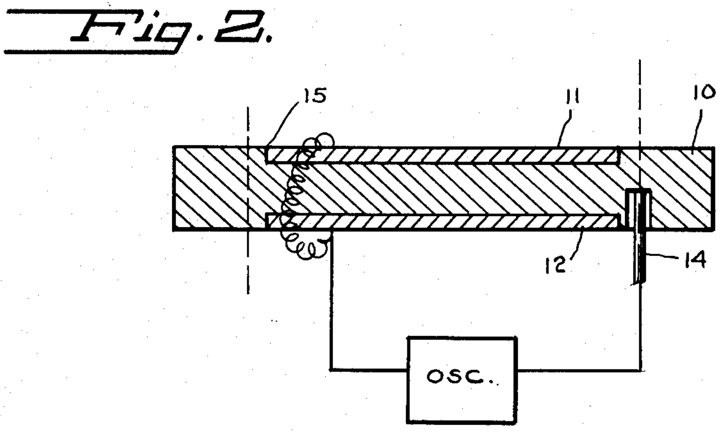

For a more complete understanding of this invention reference may be had to the accompanying diagrams, in which:

FIGURE 1 shows a pictorial view of the transducers constructed according to this invention; and FIG. 2 shows a modification of FIGURE 1.

With reference to FIGURE 1, which is a pictorial view of a composite disc, partly in section, two layers 11, 12 of piezoelectric material are permanently and intimately bonded to opposite surfaces of a metallic plate 10. Electrical leads 13, 14 are attached to the layers 11, 12 at the nodal locus of the vibrating structure, i.e., a nodal circle.

The layers 11, 12 are relatively thin taking up no more than half of the total thickness of the structure, and, conversely, the metallic body 12 is relatively thick. The piezoelectric layers 11, 12 may be made of ceramic ferroelectric materials such as barium titanate, or crystalline material such as quartz.

Ceramic ferroelectric materials such as barium titanate are desirable because of their high degree of piezoelectric activity, but efficiency of energy conversion would normally be sacrificed due to the high internal losses inherent in such materials. In the configuration shown in FIGURE 1, however, virtually the enire structure consists of metal 10 which can be chosen for its low loss qualities. Such metals are for example: aluminum, tungsten, beryllium copper. The thin layers 11 and 12 of the piezoelectric material are not strained any more than an equivalent portion of a completely piezoelectric device. Since they now represent a smaller portion of the total vibrating mass, their contribution to the total losses in the system are proportionately lower. The choice of a metal of low density and high elastic modulus, such as beryllium, endows the disk with property of vibrating at a higher frequency for a given set of dimensions thus increasing the effective loading of the air and thereby increasing the efficiency capabilities of the disk. When piezoelectric electric layers 11, 12 and a metal 10 which possesses a higher temperature coefficient than layers 11 and 12 are bonded together with a cement or solder for example at temperatures considerably above operating temperature, the cooling of the assembly causes large compressive stresses to be set up in materials 11 and 12. Most piezoelectric materials are very strong in compression but weak in tension. Thus, violent flexure vibrations which result in large excursions and attendant large tension strain on the piezoelectric materials, and would normally result in failure of unstressed materials, can be withstood easily by the prestressed piezoelectric material of the composite structure. Therefore, very high power can be applied to the prestressed structure without causing damage or failure. A particularly good selection for this purpose is quartz on aluminum.

An additional advantage is that the electric impedance level of the transducer is lowered while maintaining the same mechanical characteristics thus providing for more reasonable electric potentials when producing high power acoustic radiation.

FIGURE 2 shows the cross section of a modified embodiment of the invention which has several advantages over the device of FIGURE 1. In this embodiment the piezoelectric material 11, 12, is coated on the metallic body 10 in a central recess 15. It has been found that the piezoelectric material beyond the nodal locus of a member vibrating in the first symmetrical mode does not contribute to the forces which result in flexure, and therefore the piezoelectric material beyond this locus can be eliminated. However since the thickness should be uniform over the disc, the eliminated piezoelectric material is replaced by the metallic body 10. The proportions of the piezoelectric and metallic materials are preferably such that the nodal locus (shown dotted in FIGURE 2), is located on the metallic body and not on the piezoelectric material, i.e., the piezoelectric material does not extend as far as the nodal locus. This will allow anchoring of the support 14 to the exact nodal positions which are located on the central plane of the body 10 instead of the approximate nodal position on the surface of the body 10. This can be done by drilling through the body 10 to a depth half way through the body 10 and anchoring the support 14 to the body 10 at this point. Thus, there is no necessity of drilling through the piezoelectric material 11 or 12.

Since all motion of the end of the support is eliminated, the support 14 can be relatively stiff. An electrical advantage arises if the surfaces of the piezoelectric portions 11, 12 are metallically plated and electrically tied together by wire 16, and an electronic oscillator 17 is connected between wire 16 and support 14. In this way the electric leads do not add to the losses of the mounting and the impedance of the oscillator load is only one quarter of the load presented by the sandwich configuration of FIGURE 1 where the oscillator would be connected across the supporting leads 13, 14.

The high power transducer of this invention is expected to be used primarily according to the principles of the copending application previously referred to for high efficiency.

Although such transducers are normally disc shaped, the construction proposed by this invention should not be limited thereby. It is possible, and perhaps preferable, to use this composite construction in all types of piezoelectrically vibrating members to reduce internal losses and increase strength without restriction as to shape. It is to be noted that during the first symmetrical mode of vibration of a crystalline piezoelectric disc the convex to concave configuration is accomplished by periodic elongation along a diameter on one surface and simultaneous contraction along the diameter, normal to the first, on the opposite surface. This effect can be accomplished with crystalline piezoelectric materials only if the material is on both sides of the disc.

Ceramic type piezoelectric materials which exhibit true radial expansion and contraction need be applied to only one side of the metallic disc to produce a flexure mode vibrating disc, however.

Also if the crystalline piezoelectric material is to elongate and contact only in one direction, as for example in a vibrating tape, the piezoelectric surface need be applied to only one side of the metallic body. Basically, then, the invention envisions a piezoelectric device comprising a relatively thick metallic body of low internal losses with a relatively thin piezoelectric layer intimately bonded to at least one surface thereof, and in which the piezoelectric material can be limited to the area internal of the nodal locus or loci.

I claim:

1. A piezoelectric transducer comprising:

a metallic body and a piezoelectric material secured to at least one side of said metallic body to form an integral composite structure responsive to voltage applied between said metallic body and said piezoelectric material to vary the degree of flexural cupping of said composite structure about a nodal circle in said structure;

said structure being supported substantially at said nodal circle with its periphery and center free to vibrate in flexure without restraint;

the thickness of said piezoelectric material being less than that of said metallic body.

2. The transducer of claim 1, in which said metallic body is circular.

3. The transducer of claim 2, in which said piezoelectric material comprises a pair of X-cut quartz crystals, secured to opposite faces of said metallic body with their mechanical Y axes perpendicular to each other, the total thickness of said pair of crystals being less than the thickness of said metallic body.

4. The transducer of claim 3 in which said metallic body is of aluminum.

5. A transducer in accordance with claim 1, in which said metallic body has a recess in at least one surface thereof within said nodal circle, said piezoelectric material being confined to said recess in said metallic body.

6. A transducer in accordance with claim 5, wherein said metallic body, said recess and said piezoelectric material are all circular in form, said piezoelectric material is of quartz, and said metallic body is of aluminum.

7. A transducer in accordance with claim 1, in which said piezoelectric material is prestressed.

References Cited in the file of this patent

UNITED STATES PATENTS

| | | |
|---|---|---|
| 1,766,036 | Crossley | June 24, 1930 |
| 2,086,891 | Bachmann et al. | July 13, 1937 |
| 2,202,391 | Mason | May 28, 1940 |
| 2,406,792 | Benioff | Sept. 3, 1946 |
| 2,558,563 | Janssen | June 26, 1951 |
| 2,589,403 | Kurie | Mar. 18, 1952 |
| 2,833,999 | Howry | May 6, 1958 |
| 2,878,403 | Legrand | Mar. 17, 1959 |